(12) United States Patent
genannt Berghegger et al.

(10) Patent No.: US 8,792,256 B2
(45) Date of Patent: Jul. 29, 2014

(54) CONTROLLER FOR A SWITCH AND METHOD OF OPERATING THE SAME

(75) Inventors: Ralf Schroeder genannt Berghegger, Glandorf (DE); Michael Frey, Erfurt (DE)

(73) Assignee: Power Systems Technologies Ltd., Ebene (MU)

( * ) Notice: Subject to any disclaimer, the term of this patent is extended or adjusted under 35 U.S.C. 154(b) by 267 days.

(21) Appl. No.: 13/360,516

(22) Filed: Jan. 27, 2012

(65) Prior Publication Data

US 2013/0194826 A1    Aug. 1, 2013

(51) Int. Cl.
*H02M 1/08* (2006.01)

(52) U.S. Cl.
USPC .......................... 363/21.13; 327/109; 326/82

(58) Field of Classification Search
CPC .................................. H02M 1/08; H03K 17/12
USPC ................... 363/21.13; 327/109, 419; 326/82
See application file for complete search history.

(56) References Cited

U.S. PATENT DOCUMENTS

| | | |
|---|---|---|
| 1,376,978 A | 5/1921 | Stoekle |
| 3,007,060 A | 10/1961 | Guenther |
| 3,346,798 A | 10/1967 | Dinger |
| 3,358,210 A | 12/1967 | Grossoehme |
| 3,433,998 A | 3/1969 | Woelber |
| 3,484,562 A | 12/1969 | Kronfeld |
| 3,553,620 A | 1/1971 | Cielo et al. |
| 3,622,868 A | 11/1971 | Todt |
| 3,681,679 A | 8/1972 | Chung |
| 3,708,742 A | 1/1973 | Gunn |
| 3,708,744 A | 1/1973 | Stephens et al. |
| 4,011,498 A | 3/1977 | Hamsra |
| 4,019,122 A | 4/1977 | Ryan |
| 4,075,547 A | 2/1978 | Wroblewski |
| 4,202,031 A | 5/1980 | Hesler et al. |
| 4,257,087 A | 3/1981 | Cuk |
| 4,274,071 A | 6/1981 | Pfarre |
| 4,327,348 A | 4/1982 | Hirayama |
| 4,471,423 A | 9/1984 | Hase |
| 4,499,481 A | 2/1985 | Greene |
| 4,570,174 A | 2/1986 | Huang et al. |
| 4,577,268 A | 3/1986 | Easter et al. |

(Continued)

FOREIGN PATENT DOCUMENTS

| | | |
|---|---|---|
| CN | 101141099 | 3/2008 |
| CN | 101202509 | 6/2008 |

(Continued)

OTHER PUBLICATIONS

Bill Andreycak, Active Clamp and Reset Technique Enhances Forward Converter Performance, Oct. 1994, Texas Instruments, 19 pages.

(Continued)

*Primary Examiner* — Harry Behm
(74) *Attorney, Agent, or Firm* — Boisbrun Hofman, PLLC

(57) ABSTRACT

A controller for a switch and a method of operating the same. In one embodiment, the controller is configured to measure a voltage of a control terminal of the switch and select a first mode of operation if the voltage of the control terminal is greater than a threshold voltage, and a second mode of operation if the voltage of the control terminal is less than the threshold voltage.

20 Claims, 8 Drawing Sheets

(56) References Cited

U.S. PATENT DOCUMENTS

| | | | |
|---|---|---|---|
| 4,581,691 | A | 4/1986 | Hock |
| 4,613,841 | A | 9/1986 | Roberts |
| 4,636,823 | A | 1/1987 | Margalit et al. |
| 4,660,136 | A | 4/1987 | Montorefano |
| 4,672,245 | A * | 6/1987 | Majumdar et al. ............ 327/375 |
| 4,770,667 | A | 9/1988 | Evans et al. |
| 4,770,668 | A | 9/1988 | Skoultchi et al. |
| 4,780,653 | A | 10/1988 | Bezos et al. |
| 4,785,387 | A | 11/1988 | Lee et al. |
| 4,799,138 | A | 1/1989 | Chahabadi et al. |
| 4,803,609 | A | 2/1989 | Gillett et al. |
| 4,823,249 | A | 4/1989 | Garcia, II |
| 4,837,496 | A | 6/1989 | Erdi |
| 4,866,367 | A | 9/1989 | Ridley et al. |
| 4,876,638 | A | 10/1989 | Silva et al. |
| 4,887,061 | A | 12/1989 | Matsumura |
| 4,899,271 | A | 2/1990 | Seiersen |
| 4,903,089 | A | 2/1990 | Hollis et al. |
| 4,922,400 | A | 5/1990 | Cook |
| 4,962,354 | A | 10/1990 | Visser et al. |
| 4,964,028 | A | 10/1990 | Spataro |
| 4,999,759 | A | 3/1991 | Cavagnolo et al. |
| 5,003,277 | A | 3/1991 | Sokai et al. |
| 5,014,178 | A | 5/1991 | Balakrishnan |
| 5,027,264 | A | 6/1991 | DeDoncker et al. |
| 5,055,991 | A | 10/1991 | Carroll |
| 5,068,756 | A | 11/1991 | Morris et al. |
| 5,106,778 | A | 4/1992 | Hollis et al. |
| 5,126,714 | A | 6/1992 | Johnson |
| 5,132,888 | A | 7/1992 | Lo et al. |
| 5,134,771 | A | 8/1992 | Lee et al. |
| 5,172,309 | A | 12/1992 | DeDoncker et al. |
| 5,177,460 | A | 1/1993 | Dhyanchand et al. |
| 5,182,535 | A | 1/1993 | Dhyanchand |
| 5,204,809 | A | 4/1993 | Andresen |
| 5,206,621 | A | 4/1993 | Yerman |
| 5,208,739 | A | 5/1993 | Sturgeon |
| 5,223,449 | A | 6/1993 | Morris et al. |
| 5,225,971 | A | 7/1993 | Spreen |
| 5,231,037 | A | 7/1993 | Yuan et al. |
| 5,244,829 | A | 9/1993 | Kim |
| 5,262,930 | A | 11/1993 | Hua et al. |
| 5,291,382 | A | 3/1994 | Cohen |
| 5,303,138 | A | 4/1994 | Rozman |
| 5,305,191 | A | 4/1994 | Loftus, Jr. |
| 5,335,163 | A | 8/1994 | Seiersen |
| 5,336,985 | A | 8/1994 | McKenzie |
| 5,342,795 | A | 8/1994 | Yuan et al. |
| 5,343,140 | A | 8/1994 | Gegner |
| 5,353,001 | A | 10/1994 | Meinel et al. |
| 5,369,042 | A | 11/1994 | Morris et al. |
| 5,374,887 | A | 12/1994 | Drobnik |
| 5,399,968 | A | 3/1995 | Sheppard et al. |
| 5,407,842 | A | 4/1995 | Morris et al. |
| 5,453,923 | A | 9/1995 | Scalais et al. |
| 5,459,652 | A | 10/1995 | Faulk |
| 5,468,661 | A | 11/1995 | Yuan et al. |
| 5,477,175 | A | 12/1995 | Tisinger et al. |
| 5,508,903 | A | 4/1996 | Alexndrov |
| 5,523,673 | A | 6/1996 | Ratliff et al. |
| 5,539,630 | A | 7/1996 | Pietkiewicz et al. |
| 5,554,561 | A | 9/1996 | Plumton |
| 5,555,494 | A | 9/1996 | Morris |
| 5,581,224 | A | 12/1996 | Yamamguchi |
| 5,610,085 | A | 3/1997 | Yuan et al. |
| 5,624,860 | A | 4/1997 | Plumton et al. |
| 5,661,642 | A | 8/1997 | Shimashita |
| 5,663,876 | A | 9/1997 | Newton et al. |
| 5,671,131 | A | 9/1997 | Brown |
| 5,700,703 | A | 12/1997 | Huang et al. |
| 5,712,189 | A | 1/1998 | Plumton et al. |
| 5,719,544 | A | 2/1998 | Vinciarelli et al. |
| 5,734,564 | A | 3/1998 | Brkovic |
| 5,736,842 | A | 4/1998 | Jovanovic |
| 5,742,491 | A | 4/1998 | Bowman et al. |
| 5,747,842 | A | 5/1998 | Plumton |
| 5,756,375 | A | 5/1998 | Celii et al. |
| 5,760,671 | A | 6/1998 | Lahr et al. |
| 5,783,984 | A | 7/1998 | Keuneke |
| 5,784,266 | A | 7/1998 | Chen |
| 5,804,943 | A | 9/1998 | Kollman et al. |
| 5,815,386 | A | 9/1998 | Gordon |
| 5,864,110 | A | 1/1999 | Moriguchi et al. |
| 5,870,299 | A | 2/1999 | Rozman |
| 5,886,508 | A | 3/1999 | Jutras |
| 5,889,298 | A | 3/1999 | Plumton et al. |
| 5,889,660 | A | 3/1999 | Taranowski et al. |
| 5,900,822 | A | 5/1999 | Sand et al. |
| 5,907,481 | A | 5/1999 | Svardsjo |
| 5,909,110 | A | 6/1999 | Yuan et al. |
| 5,910,665 | A | 6/1999 | Plumton et al. |
| 5,920,475 | A | 7/1999 | Boylan et al. |
| 5,925,088 | A | 7/1999 | Nasu |
| 5,929,665 | A | 7/1999 | Ichikawa et al. |
| 5,933,338 | A | 8/1999 | Wallace |
| 5,940,287 | A | 8/1999 | Brkovic |
| 5,946,207 | A | 8/1999 | Schoofs |
| 5,956,245 | A | 9/1999 | Rozman |
| 5,956,578 | A | 9/1999 | Weitzel et al. |
| 5,959,850 | A | 9/1999 | Lim |
| 5,977,853 | A | 11/1999 | Ooi et al. |
| 5,982,640 | A | 11/1999 | Naveed |
| 5,999,066 | A | 12/1999 | Saito et al. |
| 5,999,429 | A | 12/1999 | Brown |
| 6,003,139 | A | 12/1999 | McKenzie |
| 6,008,519 | A | 12/1999 | Yuan et al. |
| 6,011,703 | A | 1/2000 | Boylan et al. |
| 6,038,154 | A | 3/2000 | Boylan et al. |
| 6,046,664 | A | 4/2000 | Weller et al. |
| 6,060,943 | A | 5/2000 | Jansen |
| 6,067,237 | A | 5/2000 | Nguyen |
| 6,069,798 | A | 5/2000 | Liu |
| 6,069,799 | A | 5/2000 | Bowman et al. |
| 6,078,510 | A | 6/2000 | Spampinato et al. |
| 6,084,792 | A | 7/2000 | Chen et al. |
| 6,094,038 | A | 7/2000 | Lethellier |
| 6,097,046 | A | 8/2000 | Plumton |
| 6,125,046 | A | 9/2000 | Jang et al. |
| 6,144,187 | A | 11/2000 | Bryson |
| 6,147,886 | A | 11/2000 | Wittenbreder |
| 6,156,611 | A | 12/2000 | Lan et al. |
| 6,160,721 | A | 12/2000 | Kossives et al. |
| 6,163,466 | A | 12/2000 | Davila, Jr. et al. |
| 6,181,231 | B1 | 1/2001 | Bartilson |
| 6,188,586 | B1 | 2/2001 | Farrington et al. |
| 6,191,964 | B1 | 2/2001 | Boylan et al. |
| 6,208,535 | B1 | 3/2001 | Parks |
| 6,212,084 | B1 | 4/2001 | Turner |
| 6,215,290 | B1 | 4/2001 | Yang et al. |
| 6,218,891 | B1 | 4/2001 | Lotfi et al. |
| 6,229,197 | B1 | 5/2001 | Plumton et al. |
| 6,262,564 | B1 | 7/2001 | Kanamori |
| 6,288,501 | B1 | 9/2001 | Nakamura et al. |
| 6,288,920 | B1 | 9/2001 | Jacobs et al. |
| 6,295,217 | B1 | 9/2001 | Yang et al. |
| 6,304,460 | B1 | 10/2001 | Cuk |
| 6,309,918 | B1 | 10/2001 | Huang et al. |
| 6,317,021 | B1 | 11/2001 | Jansen |
| 6,317,337 | B1 | 11/2001 | Yasumura |
| 6,320,490 | B1 | 11/2001 | Clayton |
| 6,323,090 | B1 | 11/2001 | Zommer |
| 6,325,035 | B1 | 12/2001 | Codina et al. |
| 6,344,986 | B1 | 2/2002 | Jain et al. |
| 6,348,848 | B1 | 2/2002 | Herbert |
| 6,351,396 | B1 | 2/2002 | Jacobs |
| 6,356,462 | B1 | 3/2002 | Jang et al. |
| 6,362,986 | B1 | 3/2002 | Schultz et al. |
| 6,373,727 | B1 | 4/2002 | Hedenskog et al. |
| 6,373,734 | B1 | 4/2002 | Martinelli |
| 6,380,836 | B2 | 4/2002 | Matsumoto et al. |
| 6,388,898 | B1 | 5/2002 | Fan et al. |
| 6,392,902 | B1 | 5/2002 | Jang et al. |
| 6,396,718 | B1 | 5/2002 | Ng et al. |
| 6,400,579 | B2 | 6/2002 | Cuk |

(56) References Cited

U.S. PATENT DOCUMENTS

| | | |
|---|---|---|
| 6,414,578 B1 | 7/2002 | Jitaru |
| 6,418,039 B2 | 7/2002 | Lentini et al. |
| 6,438,009 B2 | 8/2002 | Assow |
| 6,445,598 B1 | 9/2002 | Yamada |
| 6,462,965 B1 | 10/2002 | Uesono |
| 6,466,461 B2 | 10/2002 | Mao et al. |
| 6,469,564 B1 | 10/2002 | Jansen |
| 6,477,065 B2 | 11/2002 | Parks |
| 6,483,724 B1 | 11/2002 | Blair et al. |
| 6,489,754 B2 | 12/2002 | Blom |
| 6,498,367 B1 | 12/2002 | Chang et al. |
| 6,501,193 B1 | 12/2002 | Krugly |
| 6,504,321 B2 | 1/2003 | Giannopoulos et al. |
| 6,512,352 B2 | 1/2003 | Qian |
| 6,525,603 B1 | 2/2003 | Morgan |
| 6,539,299 B2 | 3/2003 | Chatfield et al. |
| 6,545,453 B2 | 4/2003 | Glinkowski et al. |
| 6,548,992 B1 | 4/2003 | Alcantar et al. |
| 6,549,436 B1 | 4/2003 | Sun |
| 6,552,917 B1 | 4/2003 | Bourdillon |
| 6,559,689 B1 * | 5/2003 | Clark ............................ 327/97 |
| 6,563,725 B2 | 5/2003 | Carsten |
| 6,570,268 B1 | 5/2003 | Perry et al. |
| 6,580,627 B2 | 6/2003 | Toshio |
| 6,608,768 B2 | 8/2003 | Sula |
| 6,611,132 B2 | 8/2003 | Nakagawa et al. |
| 6,614,206 B1 | 9/2003 | Wong et al. |
| 6,654,259 B2 | 11/2003 | Koshita et al. |
| 6,661,276 B1 | 12/2003 | Chang |
| 6,674,658 B2 | 1/2004 | Mao et al. |
| 6,683,797 B2 | 1/2004 | Zaitsu et al. |
| 6,687,137 B1 | 2/2004 | Yasumura |
| 6,696,910 B2 | 2/2004 | Nuytkens et al. |
| 6,731,486 B2 | 5/2004 | Holt et al. |
| 6,741,099 B1 | 5/2004 | Krugly |
| 6,751,106 B2 | 6/2004 | Zhang et al. |
| 6,753,723 B2 | 6/2004 | Zhang |
| 6,765,810 B2 | 7/2004 | Perry |
| 6,775,159 B2 | 8/2004 | Webb et al. |
| 6,784,644 B2 | 8/2004 | Xu et al. |
| 6,804,125 B2 | 10/2004 | Brkovic |
| 6,813,170 B2 | 11/2004 | Yang |
| 6,831,847 B2 | 12/2004 | Perry |
| 6,839,247 B1 | 1/2005 | Yang et al. |
| 6,856,149 B2 | 2/2005 | Yang |
| 6,862,194 B2 | 3/2005 | Yang et al. |
| 6,867,678 B2 | 3/2005 | Yang |
| 6,867,986 B2 | 3/2005 | Amei |
| 6,873,237 B2 | 3/2005 | Chandrasekaran et al. |
| 6,882,548 B1 | 4/2005 | Jacobs et al. |
| 6,906,934 B2 | 6/2005 | Yang et al. |
| 6,943,553 B2 | 9/2005 | Zimmermann |
| 6,944,033 B1 | 9/2005 | Xu et al. |
| 6,977,824 B1 | 12/2005 | Yang et al. |
| 6,980,077 B1 | 12/2005 | Chandrasekaran et al. |
| 6,982,887 B2 | 1/2006 | Batarseh et al. |
| 7,009,486 B1 | 3/2006 | Goeke et al. |
| 7,012,414 B1 | 3/2006 | Mehrotra et al. |
| 7,016,204 B2 | 3/2006 | Yang et al. |
| 7,026,807 B2 | 4/2006 | Anderson et al. |
| 7,034,586 B2 | 4/2006 | Mehas et al. |
| 7,034,647 B2 | 4/2006 | Yan et al. |
| 7,046,523 B2 | 5/2006 | Sun et al. |
| 7,061,358 B1 | 6/2006 | Yang |
| 7,072,189 B2 | 7/2006 | Kim |
| 7,075,799 B2 | 7/2006 | Qu |
| 7,076,360 B1 | 7/2006 | Ma |
| 7,095,638 B2 | 8/2006 | Uusitalo |
| 7,099,163 B1 | 8/2006 | Ying |
| 7,136,293 B2 | 11/2006 | Petkov et al. |
| 7,148,669 B2 | 12/2006 | Maksimovic et al. |
| 7,170,268 B2 | 1/2007 | Kim |
| 7,176,662 B2 | 2/2007 | Chandrasekaran |
| 7,209,024 B2 | 4/2007 | Nakahori |
| 7,269,038 B2 | 9/2007 | Shekhawat et al. |
| 7,280,026 B2 | 10/2007 | Chandrasekaran et al. |
| 7,285,807 B2 | 10/2007 | Brar et al. |
| 7,298,118 B2 | 11/2007 | Chandrasekaran |
| 7,301,785 B2 | 11/2007 | Yasumura |
| 7,312,686 B2 | 12/2007 | Bruno |
| 7,321,283 B2 | 1/2008 | Mehrotra et al. |
| 7,332,992 B2 | 2/2008 | Iwai |
| 7,339,208 B2 | 3/2008 | Brar et al. |
| 7,339,801 B2 | 3/2008 | Yasumura |
| 7,348,612 B2 | 3/2008 | Sriram et al. |
| 7,362,592 B2 | 4/2008 | Yang et al. |
| 7,362,593 B2 | 4/2008 | Yang et al. |
| 7,375,607 B2 | 5/2008 | Lee et al. |
| 7,385,375 B2 | 6/2008 | Rozman |
| 7,386,404 B2 | 6/2008 | Cargonja et al. |
| 7,393,247 B1 | 7/2008 | Yu et al. |
| 7,417,875 B2 | 8/2008 | Chandrasekaran et al. |
| 7,427,910 B2 | 9/2008 | Mehrotra et al. |
| 7,431,862 B2 | 10/2008 | Mehrotra et al. |
| 7,439,556 B2 | 10/2008 | Brar et al. |
| 7,439,557 B2 | 10/2008 | Brar et al. |
| 7,446,512 B2 | 11/2008 | Nishihara et al. |
| 7,447,049 B2 | 11/2008 | Garner et al. |
| 7,453,709 B2 | 11/2008 | Park et al. |
| 7,462,891 B2 | 12/2008 | Brar et al. |
| 7,468,649 B2 | 12/2008 | Chandrasekaran |
| 7,471,523 B2 | 12/2008 | Yang |
| 7,489,225 B2 | 2/2009 | Dadafshar |
| 7,499,295 B2 | 3/2009 | Indika de Silva et al. |
| 7,504,673 B2 | 3/2009 | Brar et al. |
| 7,554,430 B2 | 6/2009 | Mehrotra et al. |
| 7,558,082 B2 | 7/2009 | Jitaru |
| 7,567,445 B2 | 7/2009 | Coulson et al. |
| 7,626,370 B1 | 12/2009 | Mei et al. |
| 7,630,219 B2 | 12/2009 | Lee |
| 7,633,369 B2 | 12/2009 | Chandrasekaran et al. |
| 7,663,183 B2 | 2/2010 | Brar et al. |
| 7,667,986 B2 | 2/2010 | Artusi et al. |
| 7,675,758 B2 | 3/2010 | Artusi et al. |
| 7,675,759 B2 | 3/2010 | Artusi et al. |
| 7,675,764 B2 | 3/2010 | Chandrasekaran et al. |
| 7,715,217 B2 | 5/2010 | Manabe et al. |
| 7,733,679 B2 | 6/2010 | Luger et al. |
| 7,746,041 B2 | 6/2010 | Xu et al. |
| 7,778,050 B2 | 8/2010 | Yamashita |
| 7,778,051 B2 | 8/2010 | Yang |
| 7,787,264 B2 | 8/2010 | Yang et al. |
| 7,791,903 B2 | 9/2010 | Zhang et al. |
| 7,795,849 B2 | 9/2010 | Sohma |
| 7,813,101 B2 | 10/2010 | Morikawa |
| 7,847,535 B2 | 12/2010 | Meynard et al. |
| 7,876,191 B2 | 1/2011 | Chandrasekaran et al. |
| 7,889,517 B2 | 2/2011 | Artusi et al. |
| 7,889,521 B2 | 2/2011 | Hsu |
| 7,906,941 B2 | 3/2011 | Jayaraman et al. |
| 7,940,035 B2 | 5/2011 | Yang |
| 7,965,528 B2 | 6/2011 | Yang et al. |
| 7,983,063 B2 | 7/2011 | Lu et al. |
| 8,004,112 B2 | 8/2011 | Koga et al. |
| 8,125,205 B2 | 2/2012 | Chandrasekaran et al. |
| 8,134,443 B2 | 3/2012 | Chandrasekaran et al. |
| 8,179,699 B2 | 5/2012 | Tumminaro et al. |
| 8,278,889 B2 | 10/2012 | Tataeishi |
| 8,638,578 B2 | 1/2014 | Zhang |
| 8,643,222 B2 | 2/2014 | Brinlee et al. |
| 2001/0020886 A1 | 9/2001 | Matsumoto et al. |
| 2001/0024373 A1 | 9/2001 | Cuk |
| 2001/0055216 A1 | 12/2001 | Shirato |
| 2002/0044463 A1 | 4/2002 | Bontempo et al. |
| 2002/0057080 A1 | 5/2002 | Telefus et al. |
| 2002/0071295 A1 | 6/2002 | Nishikawa |
| 2002/0101741 A1 | 8/2002 | Brkovic |
| 2002/0110005 A1 | 8/2002 | Mao et al. |
| 2002/0114172 A1 | 8/2002 | Webb et al. |
| 2002/0145888 A1 | 10/2002 | Yoshinaga et al. |
| 2002/0167385 A1 | 11/2002 | Ackermann |
| 2002/0176262 A1 | 11/2002 | Tripathi et al. |
| 2003/0026115 A1 | 2/2003 | Miyazaki |
| 2003/0030422 A1 | 2/2003 | Sula |

(56) References Cited

U.S. PATENT DOCUMENTS

| | | |
|---|---|---|
| 2003/0063483 A1 | 4/2003 | Carsten |
| 2003/0063484 A1 | 4/2003 | Carsten |
| 2003/0086279 A1 | 5/2003 | Bourdillon |
| 2003/0197585 A1 | 10/2003 | Chandrasekaran et al. |
| 2003/0198067 A1 | 10/2003 | Sun et al. |
| 2004/0017689 A1 | 1/2004 | Zhang et al. |
| 2004/0032754 A1 | 2/2004 | Yang |
| 2004/0034555 A1 | 2/2004 | Dismukes et al. |
| 2004/0064621 A1 | 4/2004 | Dougherty et al. |
| 2004/0148047 A1 | 7/2004 | Dismukes et al. |
| 2004/0156220 A1 | 8/2004 | Kim et al. |
| 2004/0196672 A1 | 10/2004 | Amei |
| 2004/0200631 A1 | 10/2004 | Chen |
| 2004/0217794 A1 | 11/2004 | Strysko |
| 2004/0257095 A1 | 12/2004 | Yang |
| 2005/0024179 A1 | 2/2005 | Chandrasekaran et al. |
| 2005/0046404 A1 | 3/2005 | Uusitalo |
| 2005/0052224 A1 | 3/2005 | Yang et al. |
| 2005/0052886 A1 | 3/2005 | Yang et al. |
| 2005/0207189 A1 | 9/2005 | Chen |
| 2005/0245658 A1 | 11/2005 | Mehrotra et al. |
| 2005/0254266 A1 | 11/2005 | Jitaru |
| 2005/0254268 A1 | 11/2005 | Reinhard et al. |
| 2005/0281058 A1 | 12/2005 | Batarseh et al. |
| 2005/0286270 A1 | 12/2005 | Petkov et al. |
| 2006/0006975 A1 | 1/2006 | Jitaru et al. |
| 2006/0006976 A1 | 1/2006 | Bruno |
| 2006/0007713 A1 | 1/2006 | Brown |
| 2006/0018136 A1 | 1/2006 | Takahashi |
| 2006/0038549 A1 | 2/2006 | Mehrotra et al. |
| 2006/0038649 A1 | 2/2006 | Mehrotra et al. |
| 2006/0038650 A1 | 2/2006 | Mehrotra et al. |
| 2006/0044845 A1 | 3/2006 | Fahlenkamp |
| 2006/0091430 A1 | 5/2006 | Sriram et al. |
| 2006/0109698 A1 | 5/2006 | Qu |
| 2006/0187684 A1 | 8/2006 | Chandrasekaran et al. |
| 2006/0197510 A1 | 9/2006 | Chandrasekaran |
| 2006/0198173 A1 | 9/2006 | Rozman |
| 2006/0226477 A1 | 10/2006 | Brar et al. |
| 2006/0226478 A1 | 10/2006 | Brar et al. |
| 2006/0227576 A1 | 10/2006 | Yasumura |
| 2006/0237968 A1 | 10/2006 | Chandrasekaran |
| 2006/0255360 A1 | 11/2006 | Brar et al. |
| 2006/0271315 A1 | 11/2006 | Cargonja et al. |
| 2007/0007945 A1 | 1/2007 | King et al. |
| 2007/0010298 A1 | 1/2007 | Chang |
| 2007/0019356 A1 | 1/2007 | Morikawa |
| 2007/0030717 A1 | 2/2007 | Luger et al. |
| 2007/0041224 A1 | 2/2007 | Moyse et al. |
| 2007/0045765 A1 | 3/2007 | Brar et al. |
| 2007/0058402 A1 | 3/2007 | Shekhawat et al. |
| 2007/0069286 A1 | 3/2007 | Brar et al. |
| 2007/0114979 A1 | 5/2007 | Chandrasekaran |
| 2007/0120953 A1 | 5/2007 | Koga et al. |
| 2007/0121351 A1 | 5/2007 | Zhang et al. |
| 2007/0159857 A1 | 7/2007 | Lee |
| 2007/0206523 A1 | 9/2007 | Huynh et al. |
| 2007/0222463 A1 | 9/2007 | Qahouq et al. |
| 2007/0241721 A1 | 10/2007 | Weinstein et al. |
| 2007/0274106 A1 | 11/2007 | Coulson et al. |
| 2007/0274107 A1 | 11/2007 | Garner et al. |
| 2007/0296028 A1 | 12/2007 | Brar et al. |
| 2007/0296383 A1 | 12/2007 | Xu |
| 2007/0296559 A1 | 12/2007 | Brar et al. |
| 2007/0298564 A1 | 12/2007 | Brar et al. |
| 2008/0012423 A1 | 1/2008 | Mimran |
| 2008/0024094 A1 | 1/2008 | Nishihara et al. |
| 2008/0024259 A1 | 1/2008 | Chandrasekaran et al. |
| 2008/0031021 A1 | 2/2008 | Ros et al. |
| 2008/0037294 A1 | 2/2008 | Indika de Silva et al. |
| 2008/0043503 A1 | 2/2008 | Yang |
| 2008/0054874 A1 | 3/2008 | Chandrasekaran et al. |
| 2008/0080219 A1 | 4/2008 | Sohma |
| 2008/0111657 A1 | 5/2008 | Mehrotra et al. |
| 2008/0130321 A1 | 6/2008 | Artusi et al. |
| 2008/0130322 A1 | 6/2008 | Artusi et al. |
| 2008/0137381 A1 | 6/2008 | Beasley |
| 2008/0150666 A1 | 6/2008 | Chandrasekaran et al. |
| 2008/0175026 A1 | 7/2008 | Yang |
| 2008/0205104 A1 | 8/2008 | Lev et al. |
| 2008/0224812 A1 | 9/2008 | Chandrasekaran |
| 2008/0232141 A1 | 9/2008 | Artusi et al. |
| 2008/0298106 A1 | 12/2008 | Tateishi |
| 2008/0310190 A1 | 12/2008 | Chandrasekaran et al. |
| 2008/0315852 A1 | 12/2008 | Jayaraman et al. |
| 2008/0316779 A1 | 12/2008 | Jayaraman et al. |
| 2009/0002054 A1 | 1/2009 | Tsunoda et al. |
| 2009/0027926 A1 | 1/2009 | Yang et al. |
| 2009/0046486 A1 | 2/2009 | Lu et al. |
| 2009/0097290 A1 | 4/2009 | Chandrasekaran |
| 2009/0109711 A1 | 4/2009 | Hsu |
| 2009/0257250 A1 | 10/2009 | Liu |
| 2009/0273957 A1 | 11/2009 | Feldtkeller |
| 2009/0284994 A1 | 11/2009 | Lin et al. |
| 2009/0289557 A1 | 11/2009 | Itoh et al. |
| 2009/0310388 A1 | 12/2009 | Yang |
| 2009/0315530 A1 | 12/2009 | Baranwal |
| 2010/0091522 A1 | 4/2010 | Chandrasekaran et al. |
| 2010/0123486 A1 | 5/2010 | Berghegger |
| 2010/0149838 A1 | 6/2010 | Artusi et al. |
| 2010/0164443 A1 | 7/2010 | Tumminaro et al. |
| 2010/0182806 A1 | 7/2010 | Garrity et al. |
| 2010/0188876 A1 | 7/2010 | Garrity et al. |
| 2010/0202165 A1* | 8/2010 | Zheng et al. ............... 363/21.13 |
| 2010/0213989 A1* | 8/2010 | Nakatake et al. ............ 327/109 |
| 2010/0254168 A1 | 10/2010 | Chandrasekaran |
| 2010/0321958 A1 | 12/2010 | Brinlee et al. |
| 2010/0321964 A1 | 12/2010 | Brinlee et al. |
| 2011/0038179 A1 | 2/2011 | Zhang |
| 2011/0089917 A1 | 4/2011 | Chen et al. |
| 2011/0134664 A1 | 6/2011 | Berghegger |
| 2011/0149607 A1 | 6/2011 | Jungreis et al. |
| 2011/0182089 A1 | 7/2011 | Berghegger |
| 2011/0239008 A1 | 9/2011 | Lam et al. |
| 2011/0241738 A1 | 10/2011 | Tamaoka |
| 2011/3050407 | 12/2011 | Jungreis et al. |
| 2012/0243271 A1 | 9/2012 | Berghegger |
| 2012/0294048 A1 | 11/2012 | Brinlee |

FOREIGN PATENT DOCUMENTS

| | | |
|---|---|---|
| CN | 201252294 | 6/2009 |
| DE | 10310361 A1 | 9/2004 |
| EP | 0665634 | 1/1994 |
| JP | 57097361 | 6/1982 |
| JP | 3215911 | 9/1991 |
| JP | 200068132 | 3/2000 |
| WO | 8700991 | 2/1987 |
| WO | WO/2010083511 | 7/2010 |
| WO | WO/2010083514 | 7/2010 |
| WO | WO/2010114914 | 10/2010 |
| WO | WO/2011116225 | 9/2011 |

OTHER PUBLICATIONS

U.S. Appl. No. 11/211,964, filed Aug. 25, 2005, Brar, et al.

U.S. Appl. No. 11/236,376, filed Sep. 27, 2005, Brar, et al.

"AN100: Application Note using Lx100 Family of High Performance N-Ch JFET Transistors," AN100.Rev 1.01, Sep. 2003, 5 pp., Lovoltech, Inc., Santa Clara, CA.

"AN101A: Gate Drive Network for a Power JFET," AN101A.Rev 1.2, Nov. 2003, 2 pp., Lovoltech, Inc., Santa Clara, CA.

"AN108: Applications Note: How to Use Power JFETs® and MOSFETs Interchangeably in Low-Side Applications," Rev. 1.0.1, Feb. 14, 2005, 4 pp., Lovoltech, Inc., Santa Clara, CA.

Ajram, S., et al., "Ultrahigh Frequency DC-to-DC Converters Using GaAs Power Switches," IEEE Transactions on Power Electronics, Sep. 2001, pp. 594-602, vol. 16, No. 5, IEEE, Los Alamitos, CA.

Balogh, L., et al., "Power-Factor Correction with Interleaved Boost Converters in Continuous-Inductor-Current Mode," IEEE Proceedings of APEC, pp. 168-174, 1993, IEEE, Los Alamitos, CA.

(56) References Cited

OTHER PUBLICATIONS

Biernacki, J., et al., "Radio Frequency DC-DC Flyback Converter," Proceedings of the 43rd IEEE Midwest Symposium on Circuits and Systems, Aug. 8-11, 2000, pp. 94-97, vol. 1, IEEE, Los Alamitos, CA.
Chen, W., et al., "Design of High Efficiency, Low Profile, Low Voltage Converter with Integrated Magnetics," Proceedings of 1997 IEEE Applied Power Electronics Conference (APEC '97), 1997, pp. 911-917, IEEE, Los Alamitos, CA.
Chen, W., et al., "Integrated Planar Inductor Scheme for Multi-module Interleaved Quasi-Square-Wave (QSW) DC/DC Converter," 30th Annual IEEE Power Electronics Specialists Conference (PESC '99), 1999, pp. 759-762, vol. 2, IEEE, Los Alamitos, CA.
Chhawchharia, P., et al., "On the Reduction of Component Count in Switched Capacitor DC/DC Convertors," Hong Kong Polytechnic University, IEEE, 1997, Hung Hom, Kowloon, Hong King, pp. 1395-1401.
Curtis, K., "Advances in Microcontroller Peripherals Facilitate Current-Mode for Digital Power Supplies," Digital Power Forum '06, 4 pp., Sep. 2006, Darnell Group, Richardson, TX.
Eisenbeiser, K., et al., "Manufacturable GaAs VFET for Power Switching Applications," IEEE Electron Device Letters, Apr. 2000, pp. 144-145, vol. 21, No. 4, IEEE.
Freescale Semiconductor, "Implementing a Digital AC/DC Switched-Mode Power Supply using a 56F8300 Digital Signal Controller," Application Note AN3115, Aug. 2005, 24 pp., Chandler, AZ.
Freescale Semiconductor, "56F8323 Evaluation Module User Manual, 56F8300 16-bit Digital Signal Controllers", MC56F8323EVMUM, Rev. 2, Jul. 2005 (72 pages).
Freescale Semiconductor, "56F8323/56F8123 Data Sheet Preliminary Technical Data, 56F8300 16-bit Digital Signal Controllers," MC56F8323 Rev. 17, Apr. 2007 (140 pages).
Freescale Semiconductor, "Design of a Digital AC/DC SMPS using the 56F8323 Device, Designer Reference Manual, 56800E 16-bit Digital Signal Controllers", DRM074, Rev. 0, Aug. 2005 (108 pages).
Gaye, M., et al., "A 50-100MHz 5V to −5V, 1W Cuk Converter Using Gallium Arsenide Power Switches," ISCAS 2000—IEEE International Symposium on Circuits and Systems, May 28-31, 2000, pp. I-264-I-267, vol. 1, IEEE, Geneva, Switzerland.
Goldberg, A.F., et al., "Finite-Element Analysis of Copper Loss in 1-10-MHz Transformers," IEEE Transactions on Power Electronics, Apr. 1989, pp. 157-167, vol. 4, No. 2, IEEE, Los Alamitos, CA.
Goldberg, A.F., et al., "Issues Related to 1-10-MHz Transformer Design," IEEE Transactions on Power Electronics, Jan. 1989, pp. 113-123, vol. 4, No. 1, IEEE, Los Alamitos, CA.
Jitaru, I.D., et al., "Quasi-Integrated Magnetic an Avenue for Higher Power Density and Efficiency in Power Converters," 12th Annual Applied Power Electronics Conference and Exposition, Feb. 23-27, 1997, pp. 395-402, vol. 1, IEEE, Los Alamitos, CA.
Kollman, R., et al., "10 MHz PWM Converters with GaAs VFETs," IEEE 11th Annual Applied Power Electronics Conference and Exposition, Mar. 1996, pp. 264-269, vol. 1, IEEE.
Kuwabara, K., et al., "Switched-Capacitor DC-DC Converters," Fujitsu Limited, IEEE, 1988, Kawasaki, Japan, pp. 213-218.
Lee, P.-W., et al., "Steady-State Analysis of an Interleaved Boost Converter with Coupled Inductors," IEEE Transactions on Industrial Electronics, Aug. 2000, pp. 787-795, vol. 47, No. 4, IEEE, Los Alamitos, CA.
Lenk, R., "Introduction to the Tapped Buck Converter," PCIM 2000, HFPC 2000 Proceedings, Oct. 2000, pp. 155-166.
Liu, W., "Fundamentals of III-V Devices: HBTs, MESFETs, and HFETs/HEMTs," §5-5: Modulation Doping, 1999, pp. 323-330, John Wiley & Sons, New York, NY.
Maksimović, D., et al., "Switching Converters with Wide DC Conversion Range," IEEE Transactions on Power Electronics, Jan. 1991, pp. 151-157, vol. 6, No. 1, IEEE, Los Alamitos, CA.
Maxim, Application Note 725, www.maxim-ic.com/an725, Maxim Integrated Products, Nov. 29, 2001, 8 pages.

Middlebrook, R.D., "Transformerless DC-to-DC Converters with Large Conversion Ratios," IEEE Transactions on Power Electronics, Oct. 1988, pp. 484-488, vol. 3, No. 4, IEEE, Los Alamitos, CA.
Miwa, B.A., et al., "High Efficiency Power Factor Correction Using Interleaving Techniques," IEEE Proceedings of APEC, 1992, pp. 557-568, IEEE, Los Alamitos, CA.
National Semiconductor Corporation, "LM2665 Switched Capacitor Voltage Converter," www.national.com, Sep. 2005, 9 pages.
National Semiconductor Corporation, "LMC7660 Switched Capacitor Voltage Converter," www.national.com, Apr. 1997, 12 pages.
Nguyen, L.D., et al., "Ultra-High-Speed Modulation-Doped Field-Effect Transistors: A Tutorial Review," Proceedings of the IEEE, Apr. 1992, pp. 494-518, vol. 80, No. 4, IEEE.
Niemela, V.A., et al., "Comparison of GaAs and Silicon Synchronous Rectifiers in a 3.3V Out, 50W DC-DC Converter," 27th Annual IEEE Power Electronics Specialists Conference, Jun. 1996, pp. 861-867, vol. 1, IEEE.
Ninomiya, T., et al., "Static and Dynamic Analysis of Zero-Voltage-Switched Half-Bridge Converter with PWM Control," Proceedings of 1991 IEEE Power Electronics Specialists Conference (PESC '91), 1991, pp. 230-237, IEEE, Los Alamitos, CA.
O'Meara, K., "A New Output Rectifier Configuration Optimized for High Frequency Operation," Proceedings of 1991 High Frequency Power Conversion (HFPC '91) Conference, Jun. 1991, pp. 219-225, Toronto, CA.
Peng, C., et al., "A New Efficient High Frequency Rectifier Circuit," Proceedings of 1991 High Frequency Power Conversion (HFPC '91) Conference, Jun. 1991, pp. 236-243, Toronto, CA.
Pietkiewicz, A., et al. "Coupled-Inductor Current-Doubler Topology in Phase-Shifted Full-Bridge DC-DC Converter," 20th International Telecommunications Energy Conference (INTELEC), Oct. 1998, pp. 41-48, IEEE, Los Alamitos, CA.
Plumton, D.L., et al., "A Low On-Resistance High-Current GaAs Power VFET," IEEE Electron Device Letters, Apr. 1995, pp. 142-144, vol. 16, No. 4, IEEE.
Rajeev, M., "An Input Current Shaper with Boost and Flyback Converter Using Integrated Magnetics," Power Electronics and Drive Systems, 5th International Conference on Power Electronics and Drive Systems 2003, Nov. 17-20, 2003, pp. 327-331, vol. 1, IEEE, Los Alamitos, CA.
Rico, M., et al., "Static and Dynamic Modeling of Tapped-Inductor DC-to-DC Converters," 1987, pp. 281-288, IEEE, Los Alamitos, CA.
Severns, R., "Circuit Reinvention in Power Electronics and Identification of Prior Work," Proceedings of 1997 IEEE Applied Power Electronics Conference (APEC '97), 1997, pp. 3-9, IEEE, Los Alamitos, CA.
Severns, R., "Circuit Reinvention in Power Electronics and Identification of Prior Work," IEEE Transactions on Power Electronics, Jan. 2001, pp. 1-7, vol. 16, No. 1, IEEE, Los Alamitos, CA.
Sun, J., et al., "Unified Analysis of Half-Bridge Converters with Current-Doubler Rectifier," Proceedings of 2001 IEEE Applied Power Electronics Conference, 2001, pp. 514-520, IEEE, Los Alamitos, CA.
Sun, J., et al., "An Improved Current-Doubler Rectifier with Integrated Magnetics," 17th Annual Applied Power Electronics Conference and Exposition (APEC), 2002, pp. 831-837, vol. 2, IEEE, Dallas, TX.
Texas Instruments Incorporated, "LT1054, LT1054Y Switched-Capacitor Voltage Converters With Regulators," SLVS033C, Feb. 1990—Revised Jul. 1998, 25 pages.
Thaker, M., et al., "Adaptive/Intelligent Control and Power Management Reduce Power Dissipation and Consumption," Digital Power Forum '06, 11 pp., Sep. 2006, Darnell Group, Richardson, TX.
Vallamkonda, S., "Limitations of Switching Voltage Regulators," A Thesis in Electrical Engineering, Texas Tech University, May 2004, 89 pages.
Wei, J., et al., "Comparison of Three Topology Candidates for 12V VRM," IEEE APEC, 2001, pp. 245-251, IEEE, Los Alamitos, CA.
Weitzel, C.E., "RF Power Devices for Wireless Communications," 2002 IEEE MTT-S CDROM, 2002, pp. 285-288, paper TU4B-1, IEEE, Los Alamitos, CA.
Williams, R., "Modern GaAs Processing Methods," 1990, pp. 66-67, Artech House, Inc., Norwood, MA.

(56) References Cited

OTHER PUBLICATIONS

Wong, P.-L., et al., "Investigating Coupling Inductors in the Interleaving QSW VRM," 15th Annual Applied Power Electronics Conference and Exposition (APEC 2000), Feb. 2000, pp. 973-978, vol. 2, IEEE, Los Alamitos, CA.

Xu, M., et al., "Voltage Divider and its Application in the Two-stage Power Architecture," Center for Power Electronics Systems, Virginia Polytechnic Institute and State University, IEEE, 2006, Blacksburg, Virginia, pp. 499-505.

Xu, P., et al., "Design of 48 V Voltage Regulator Modules with a Novel Integrated Magnetics," IEEE Transactions on Power Electronics, Nov. 2002, pp. 990-998, vol. 17, No. 6, IEEE, Los Alamitos, CA.

Xu, P., et al., "A Family of Novel Interleaved DC/DC Converters for Low-Voltage High-Current Voltage Regulator Module Applications," IEEE Power Electronics Specialists Conference, Jun. 2001, pp. 1507-1511, IEEE, Los Alamitos, CA.

Xu, P., et al., "A Novel Integrated Current Doubler Rectifier," IEEE 2000 Applied Power Electronics Conference, Mar. 2000, pp. 735-740, IEEE, Los Alamitos, CA.

Xu, P., et al "Design and Performance Evaluation of Multi-Channel Interleaved Quasi-Square-Wave Buck Voltage Regulator Module," HFPC 2000 Proceedings, Oct. 2000, pp. 82-88.

Yan, L., et al., "Integrated Magnetic Full Wave Converter with Flexible Output Inductor," 17th Annual Applied Power Electronics Conference and Exposition (APEC), 2002, pp. 824-830, vol. 2, IEEE, Dallas, TX.

Yan, L., et al., "Integrated Magnetic Full Wave Converter with Flexible Output Inductor," IEEE Transactions on Power Electronics, Mar. 2003, pp. 670-678, vol. 18, No. 2, IEEE, Los Alamitos, CA.

Zhou, X., et al., "A High Power Density, High Efficiency and Fast Transient Voltage Regulator Module with a Novel Current Sensing and Current Sharing Technique," IEEE Applied Power Electronics Conference, Mar. 1999, pp. 289-294, IEEE, Los Alamitos, CA.

Zhou, X., et al., "Investigation of Candidate VRM Topologies for Future Microprocessors," IEEE Applied Power Electronics Conference, Mar. 1998, pp. 145-150, IEEE, Los Alamitos, CA.

Ridley, R., Designing with the TL431, Switching Power Magazine, Designer Series XV, pp. 1-5, 2005.

\* cited by examiner

US 8,792,256 B2

CONTROLLER FOR A SWITCH AND METHOD OF OPERATING THE SAME

TECHNICAL FIELD

The present invention is directed, in general, to power electronics and, more specifically, to a controller for a switch and method of operating the same.

BACKGROUND

A switched-mode power converter (also referred to as a "power converter") is a power supply or power processing circuit that converts an input voltage waveform into a specified output voltage waveform. DC-DC power converters convert a direct current ("DC") input voltage into a DC output voltage. Controllers associated with the power converters manage an operation thereof by controlling conduction periods of power switches employed therein. Generally, the controllers are coupled between an input and output of the power converter in a feedback loop configuration (also referred to as a "control loop" or "closed control loop").

Typically, the controller measures an output characteristic (e.g., an output voltage, an output current, or a combination of an output voltage and an output current) of the power converter, and based thereon modifies a duty cycle of a power switch of the power converter. The duty cycle "D" is a ratio represented by a conduction period of a power switch to a switching period thereof. In other words, the switching period includes the conduction period of the power switch (represented by the duty cycle "D") and a non-conduction period of the power switch (represented by the complementary duty cycle ("1-D"). Thus, if a power switch conducts for half of the switching period, the duty cycle for the power switch would be 0.5 (or 50 percent).

The switched-mode power converters can be constructed with different types of power switches such as bipolar transistors, metal-oxide semiconductor field-effect transistors ("MOSFETs") or insulated gate bipolar transistors ("IG-BTs"). At low power levels, for example, an output power less than 100 watts ("W"), the MOSFETs and bipolar transistors are most commonly used for power switches. While MOSFETs can work at higher switching frequency, which enables smaller designs, bipolar transistors are available at lower cost. Additionally, the different switches employ different drivers for their respective control terminals. As a result, separate driver integrated circuits are inventoried to accommodate the use of different switches in a design of a circuit (e.g., a power converter) employing the same.

Accordingly, what is needed in the art is a circuit and related method for a switch that enables a driver to be used for different types of switches such as MOSFETs and bipolar transistors that can be adapted to high-volume manufacturing techniques for a power converter or the like employing the same.

SUMMARY OF THE INVENTION

These and other problems are generally solved or circumvented, and technical advantages are generally achieved, by advantageous embodiments of the present invention, including a controller for a switch and a method of operating the same. In one embodiment, the controller is configured to measure a voltage of a control terminal of the switch and select a first mode of operation if the voltage of the control terminal is greater than a threshold voltage, and a second mode of operation if the voltage of the control terminal is less than the threshold voltage.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

The making and using of the present exemplary embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely, a controller operable with different types of switches such as a MOSFET or bipolar transistor. While the principles of the present invention will be described in the environment of a power converter, any application that may benefit from the controller as described herein including a power amplifier or a motor controller is well within the broad scope of the present invention.

Figure 1:
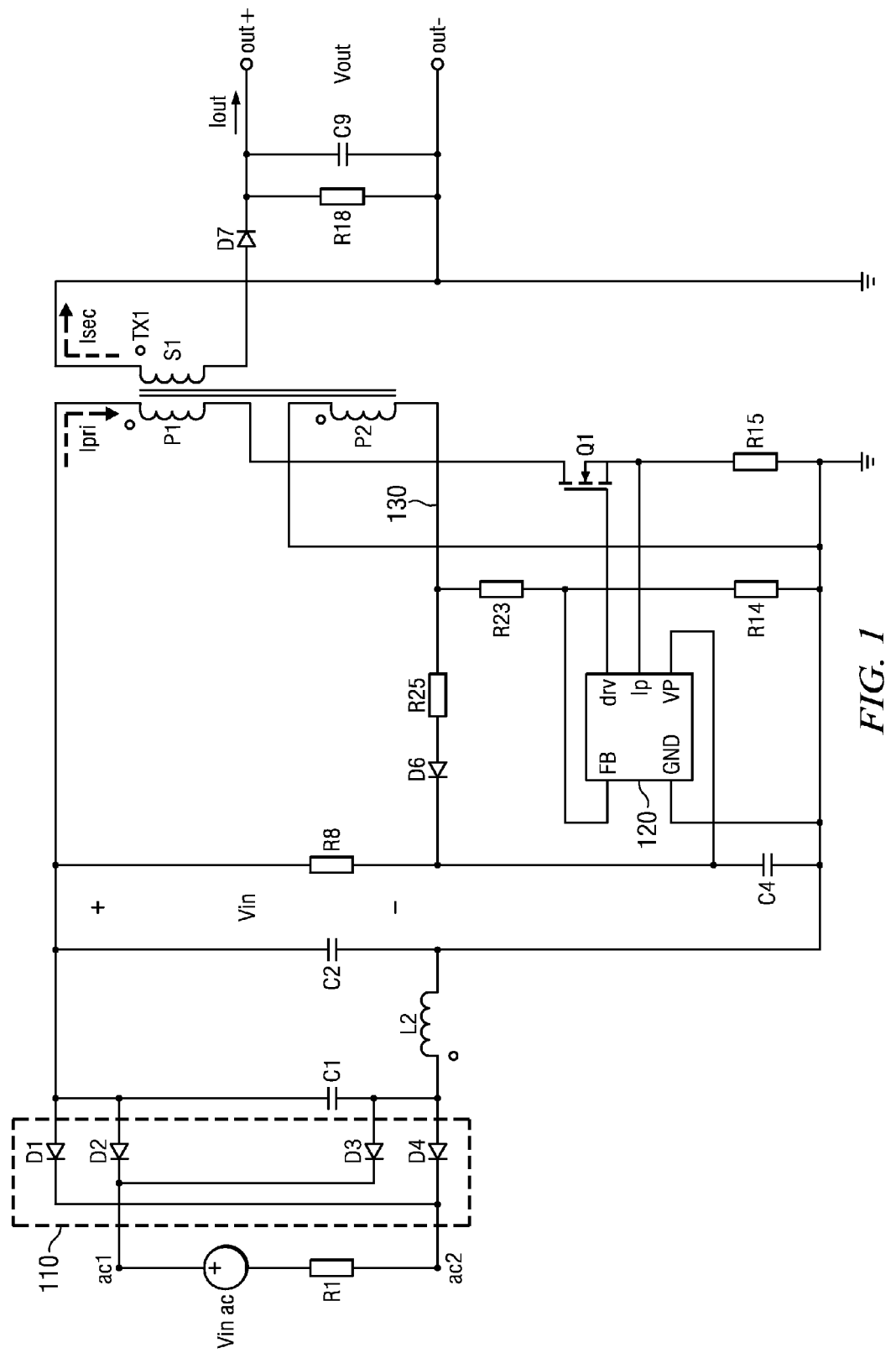
FIGS. 1 and 2 illustrate schematic diagrams of embodiments of power converters constructed according to the principles of the present invention.

Turning now to FIG. 1, illustrated is a schematic diagram of an embodiment of a power converter constructed according to the principles of the present invention. The power converter is configured to convert AC mains voltage (designated "Vac in") to a regulated DC output voltage Vout. A power train (e.g., a flyback power train) of the power converter (also referred to as a "flyback power converter") includes a power switch Q1 coupled to a source of electrical power (e.g., the AC mains) via an input filter (including capacitors C1, C2 and an inductor L2) to provide a filtered DC input voltage Vin to a magnetic device (e.g., an isolating transformer or transformer TX1). A resistor R1 represents an impedance of the AC mains. Although not illustrated, the power converter may also include an electromagnetic interference filter between the AC mains voltage Vac and a bridge rectifier 110. The transformer TX1 has a primary winding P1 and a secondary winding S1 with a turns ratio that is selected to provide the output voltage Vout with consideration of a resulting duty cycle and stress on power train components.

The power switch Q1 (e.g., a MOSFET) is controlled by a controller (e.g., an application specific integrated circuit ("ASIC")) 120 that controls the power switch Q1 to be conducting for a duty cycle. The power switch Q1 conducts in response to drive signal such as a gate drive voltage dry produced by the controller 120 with a switching frequency (often designated as "$f_s$"). The duty cycle is controlled (e.g., adjusted) by the controller 120 to regulate an output characteristic of the power converter such as an output voltage Vout, an output current Iout, or a combination thereof. A feedback signal FB traverses a feedback path (a portion of which is identified as 130) emanating from a bias winding P2 of the transformer TX1 to enable the controller 120 to control the duty cycle to regulate the output characteristic of the power converter proportional to a bias voltage VP from the bias winding P2. A series circuit arrangement of resistors R14, R23 provides a voltage divider function to scale the voltage produced for the feedback signal FB by the bias winding P2 of the transformer TX1. The bias voltage VP is substantially proportional to a voltage across the secondary winding S1 depending on a turns ratio between the primary winding P1 and the secondary winding S1.

The voltage produced across the winding P2 is rectified by a diode D6 and charges a capacitor C4 to provide an bias voltage VP for the controller 120. A resistor R25 provides a current-limit function to limit a charging current into the capacitor C4. A resistor R8 provides a start-up charge for the capacitor C4. The AC voltage or alternating voltage appearing on the secondary winding S1 of the transformer TX1 is rectified by an auxiliary power switch (e.g., diode D7 or, alternatively, by a synchronous rectifier, not shown), and the DC component of the resulting waveform is coupled to the output through the low-pass output filter including an output filter capacitor C9 to produce the output voltage Vout. A resistor R18 is included in the circuit to ensure that there is still power consumption when a load is disconnected from the output terminals out+, out− of the power converter. This ensures that the switching frequency at no load is high enough to react sufficiently to a change in the load. A current sensor R15 is coupled to the power switch Q1 and provides a voltage that is proportional to a current in the primary switch (Ip≅Ipri, wherein Ipri is a primary current flowing through the primary winding P1 of the transformer TX1) for the controller 120. This voltage is used to determine the duration of the conduction period of the power switch Q1.

During a first portion of the duty cycle, a primary current Ipri (e.g., an inductor current) flowing through the primary winding P1 of the transformer TX1 increases as current flows from the input through the power switch Q1. During a complementary portion of the duty cycle (generally co-existent with a complementary duty cycle 1-D of the power switch Q1), the power switch Q1 is transitioned to a non-conducting state. Residual magnetic energy stored in the transformer TX1 causes conduction of a secondary current Isec through the diode D7 when the power switch Q1 is off. The diode D7, which is coupled to the output filter capacitor C9, provides a path to maintain continuity of a magnetizing current of the transformer TX1. During the complementary portion of the duty cycle, the magnetizing current flowing through the secondary winding S1 of the transformer TX1 decreases. In general, the duty cycle of the power switch Q1 may be controlled (e.g., adjusted) to maintain a regulation of or regulate the output voltage Vout of the power converter.

In order to regulate the output voltage Vout, a value or a scaled value of the feedback signal FB is compared with a reference voltage within the controller 120 to control the duty cycle D. A larger duty cycle implies that the power switch Q1 is closed for a longer fraction of the switching period of the power converter. Thus, the power converter is operable with a switching cycle wherein an input voltage Vin is coupled to the transformer TX1 for a fraction of a switching period by the power switch Q1 controlled by controller 120.

In a switch-mode power converter constructed with a flyback power train, a voltage produced by the bias winding P2 during a flyback portion of a switching cycle can be related to the output voltage Vout by accounting for a turns ratio of the transformer TX1 and voltage drops in diodes and other circuit elements. The voltage produced across the bias winding P2 is employed to produce an estimate of the output voltage Vout, which in turn is used to regulate the same without crossing the isolation boundary of the transformer TX1.

Figure 2:
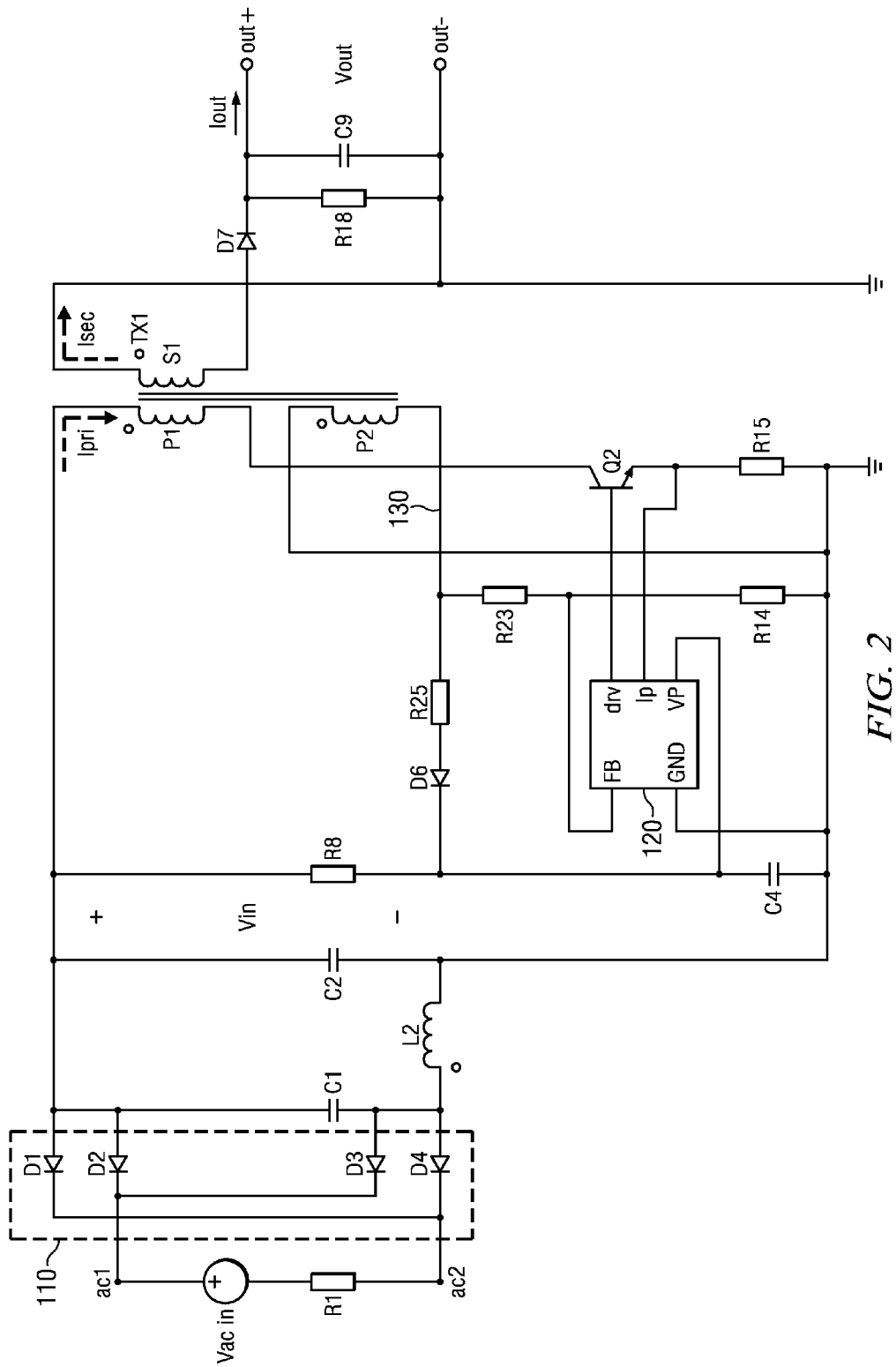

Turning now to FIG. 2, illustrated is a schematic diagram of another embodiment of a power converter constructed according to the principles of the present invention. The power switch Q2 of FIG. 2 is a bipolar transistor in lieu of the MOSFET power switch Q1 illustrated in FIG. 1. The controller 120 of FIGS. 1 and 2 is configured to operate with different types of switches as set forth below. As a result, the controller 120 can select first and second modes of operation depending on the type of power switch employed in the power converter. For instance, the controller can select the first mode of operation if the power switch is a MOSFET (see, MOSFET power switch Q1 in FIG. 1) and a second mode of operation if the power switch is a bipolar transistor (see, bipolar transistor power switch Q2 in FIG. 2). It should be understood that the principles of the present invention are not limited to only MOSFETs and bipolar transistors. The power converters of FIGS. 1 and 2 otherwise include like components that operate in similar ways and, as such, will not hereinafter be described again.

Figure 3:
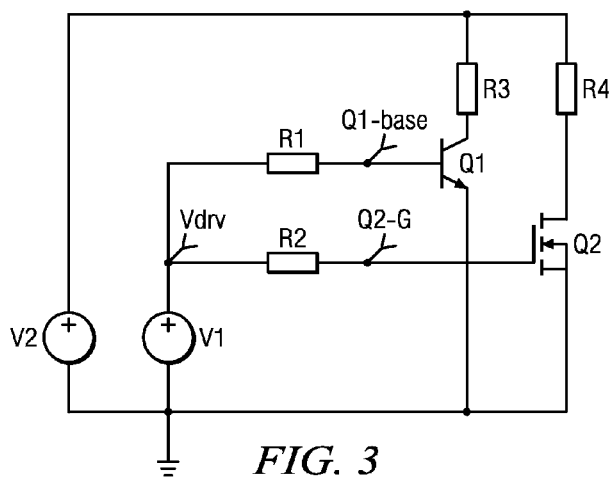
FIG. 3 illustrates a schematic diagram of different switches demonstrating the principles of the present invention.

Turning now to FIG. 3, illustrated is a schematic diagram of different switches demonstrating the principles of the present invention. The first switch is an npn bipolar transistor Q1 with a base terminal Q1-base driven by a drive signal such as a positive drive voltage V1 through a resistor R1. The second switch is an n-channel MOSFET Q2 with a gate terminal Q2-G driven by the positive drive voltage V1 through resistor R2. The resistors R1, R2 are each one kilohm ("kΩ") resistors. Since the bipolar transistor Q1 presents a forward-biased junction at its base terminal Q1-base, the voltage of the base terminal does not rise more than about 0.7 volts ("V"). The gate terminal Q2-G of the MOSFET Q2 presents a substantially open circuit to a driver, the voltage thereof rises substantially to the voltage of the drive voltage V1, which can be about 10 volts. Accordingly, the voltage at the respective control terminal of each switch can be employed to detect whether the switch is a bipolar transistor or a MOSFET.

Figure 4:
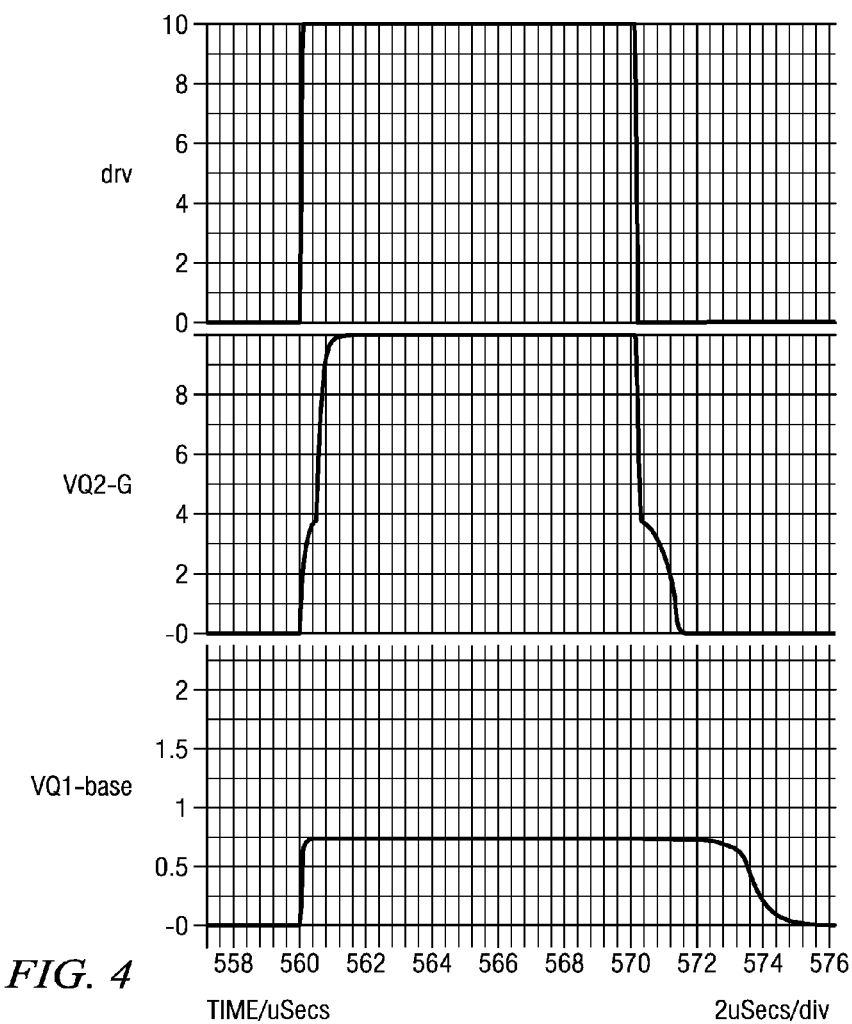
FIGS. 4 and 5 illustrate graphical representations representing the differences between switches according to the principles of the present invention.
Figure 5:
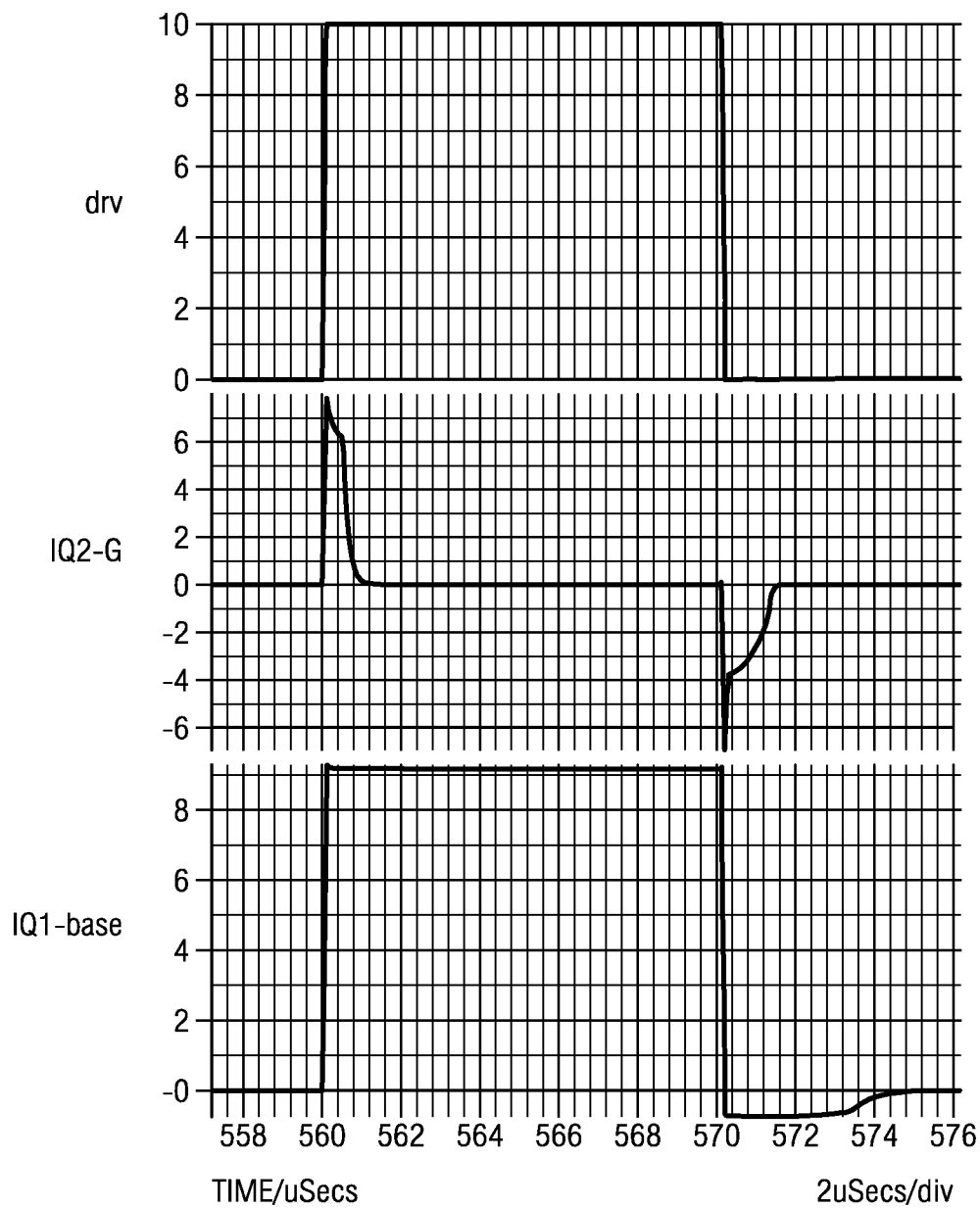

Turning now to FIGS. 4 and 5, illustrated are graphical representations illustrating the differences between switches according to the principles of the present invention. FIG. 4 illustrates a drive signal such as a drive voltage drv vs. time produced by a pulse-width modulator controller with a drive voltage of 10 volts, and the respective voltages VQ2-G, VQ1-base at the control terminals of a MOSFET and a bipolar transistor, respectively. As demonstrated, the voltage VQ2-G at the control terminal of the MOSFET rises to about 10 volts, and the voltage VQ1-base at the control terminal of the bipolar transistor rises only to about 0.7 volts.

In addition to the drive voltage drv vs. time, FIG. 5 illustrates current flowing IQ2-G into the gate terminal of the MOSFET and current IQ1-base flowing into the base terminal of the bipolar transistor. As demonstrated, a brief pulse of current flows into the gate terminal of the MOSFET as its gate-to-source capacitance is charged. Also, a continuous current of about 10 milliamperes ("mA") flows into the base terminal of the bipolar transistor. Accordingly, the current flowing into the control terminal of a switch can also be employed to detect the type of switch being used in a circuit.

Figure 6:
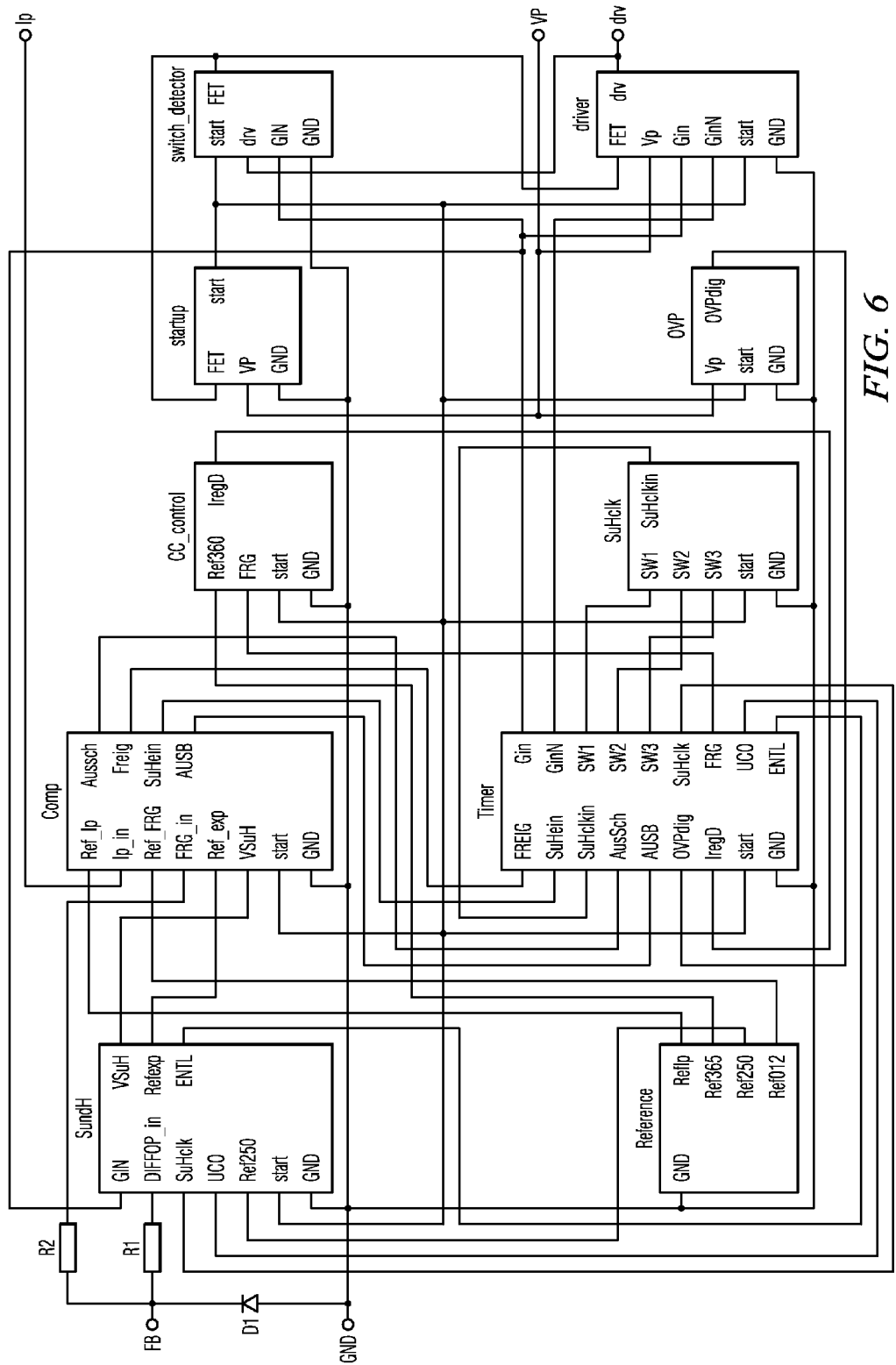
FIG. 6 illustrates a block diagram of an embodiment of a controller constructed according to the principles of the present invention.

Turning now to FIG. 6, illustrated is a block diagram of an embodiment of a controller (e.g., an application specific integrated circuit ("ASIC")) constructed according to the principles of the present invention. The controller provides an adaptable drive function dependent on a detected switch embodied in a circuit employing the same (see, e.g., the power converter of FIGS. 1 and 2). Other types of controllers that provide an adaptable drive function for a switch dependent on the detected switch are well within the broad scope of the present invention.

The controller includes a sample and hold circuit SundH that estimates the output voltage by sampling a voltage of a bias winding of a transformer (e.g., the bias winding P2 of the transformer TX1 in FIGS. 1 and 2). A comparator circuit Comp includes several comparators to compare a voltage VSuH produced by the sample and hold circuit SundH with a ramp voltage Ref_exp to determine the off time of the drive voltage drv. An output of the comparator circuit is a signal designated Freig. When the signal Freig is high, demagnetization of the transformer has been detected and the drive voltage drv of the controller can be switched on. A timer (designated "Timer") of the controller produces a pulse-width modulated signal Gin, which determines various conditions under which the drive voltage drv is switched on. Thus, the comparator circuit Comp and timer "Timer" determine when the drive voltage drv can be switched on for a switch. A reference circuit (designated "Reference") generates various reference voltages used internally by the controller.

A timing circuit SuHclk provides timing when sampling is being performed. The timing circuit SuHclk uses the output of the timer "Timer" to control the timing when a feedback signal FB (e.g., the feedback signal FB produced by the bias winding P2 of the transformer Tx1 of FIGS. 1 and 2) is sampled. Various circuit configurations to control timing of a feedback signal FB may be employed to advantage. A current control circuit CC_control calculates when the controller can be switched on to provide a constant output current because the controller can be employed to control a combination of constant voltage/constant current characteristic of a circuit such as a power converter. Thus, the off time of the drive voltage drv for a switch is controlled by a combination of the timing circuit SuHclk and the current control circuit CC_control.

In the controller, the longer of the off times calculated by the timing circuit SuHclk and the current control circuit CC_control is taken as controlling for the off time of the drive voltage drv for a switch. In a voltage-control mode, the calculation of the off time is longer in the timing circuit SuHclk. In a constant-current mode, the timing of the current control circuit CC_control is longer. Thus, the comparator circuit Comp, timing circuit SuHclk and the current control circuit CC_control operate to determine the timing of the drive voltage drv for the switch. An overvoltage protection circuit OVP of the controller provides overvoltage protection for the power converter, and transitions the controller to a safe mode (i.e., the drive voltage drv is switched off), when an abnormal condition of the bias voltage VP is detected. The controller also includes a startup circuit (designated "startup"), a switch detector (designated "switch_detector") and driver (designated "driver") that will be described in more detail below.

Figure 7:
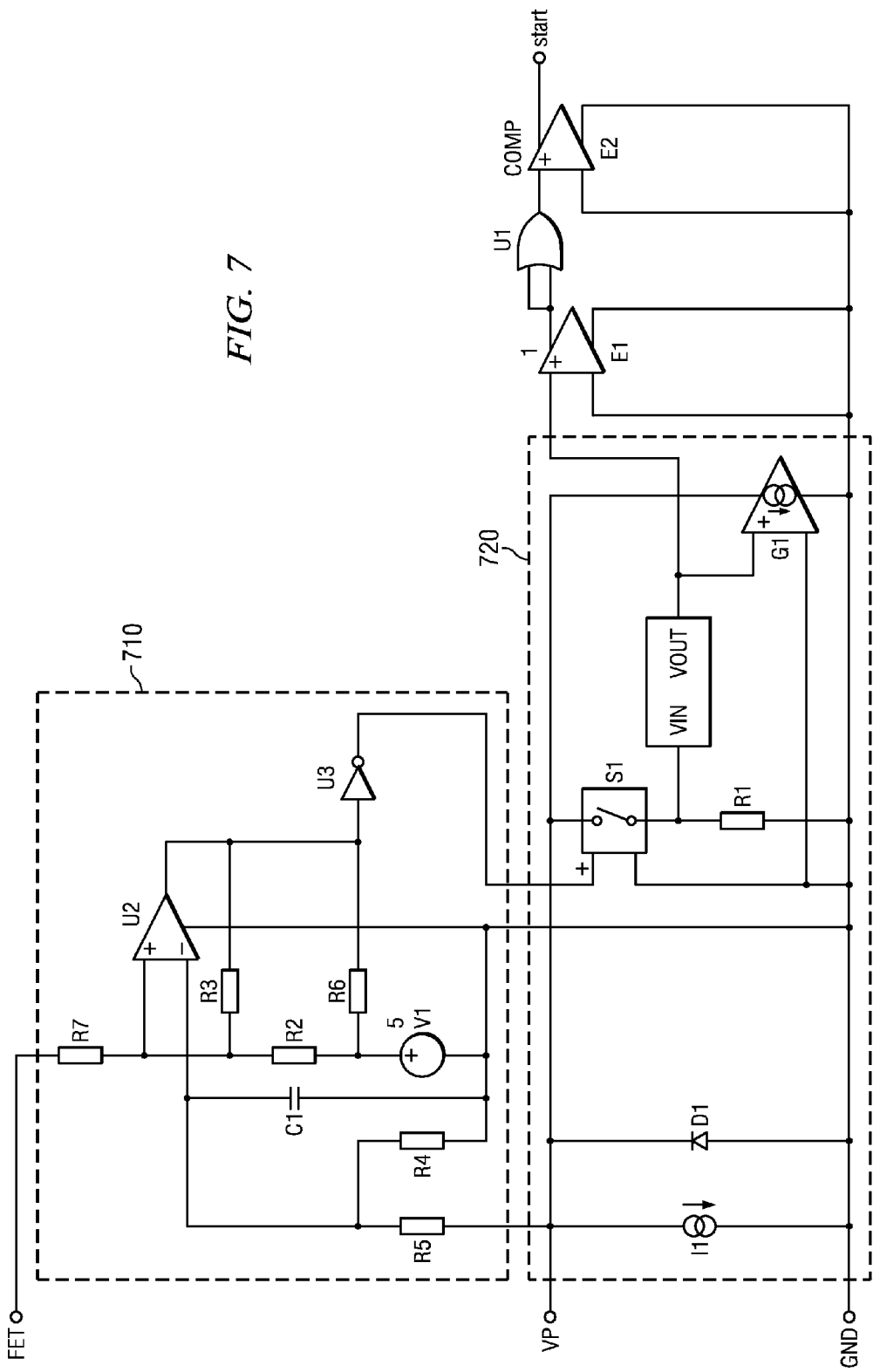
FIGS. 7 to 12 illustrated diagrams of embodiments of portions of a controller constructed according to the principles of the present invention.

Turning now to FIGS. 7 to 11, illustrated are diagrams of embodiments of portions of a controller constructed according to the principles of the present invention. Beginning with FIG. 7, illustrated is a startup circuit employable as the startup circuit (designated "startup") of FIG. 6. The startup circuit measures the bias voltage VP and when the bias voltage VP is higher than a startup level, a start signal "start" is set high to enable operation of the controller. When the bias voltage VP is lower than an under-voltage lockout level, the start signal "start" is set low to disable operation of the controller. The under-voltage lockout level is dependent on a switch detect signal FET that represents whether a MOSFET or a bipolar transistor was detected in the circuit such as a power converter. Again, the detection of a MOSFET causes the controller to select a first mode of operation, whereas the detection of a bipolar transistor causes the controller to select a second mode of operation. The under-voltage lockout level is set to a higher level when the controller operates in the first mode of operation than when the controller operates in the second mode of operation. In the environment illustrated in FIGS. 1 and 2, the startup level is higher than the under voltage lockout level to ensure that enough energy is stored in the capacitor C4 to maintain operation of the controller 120 after startup until the voltage at the output has risen high enough to power the controller 120 via the bias winding P2 of the transformer TX1.

The circuitry 710 provides a level shifting function to set the under-voltage lockout level lower when a bipolar transistor is detected. The circuitry 710 includes comparator U2, inverter U3, 5-volt voltage-reference V1 and resistors R2, R3, R4, R5, R6, R7. A MOSFET frequently requires a higher drive voltage at its gate terminal then the base terminal of a bipolar transistor to completely turn the MOSFET on. Accordingly, the under-voltage lockout level at which the controller is enabled to operate is set higher when a MOSFET is detected. The circuit illustrated in FIG. 7 is configured to produce a lower switch-off voltage than a switch-on voltage. The circuitry 720 produces a logical output coupled to the non-inverting input of a comparator E1. The output of the comparator E1 is coupled to both inputs of an OR gate U1, the output of which is coupled to the non-inverting input of a comparator E2. The output of the comparator E2 produces the start signal "start". The comparator E2 and OR gate U1 increase the slope of the start signal during transition between high and low state. The circuitry 720 represents a simulated current consumed by the controller to improve accuracy of its operation.

Figure 8:
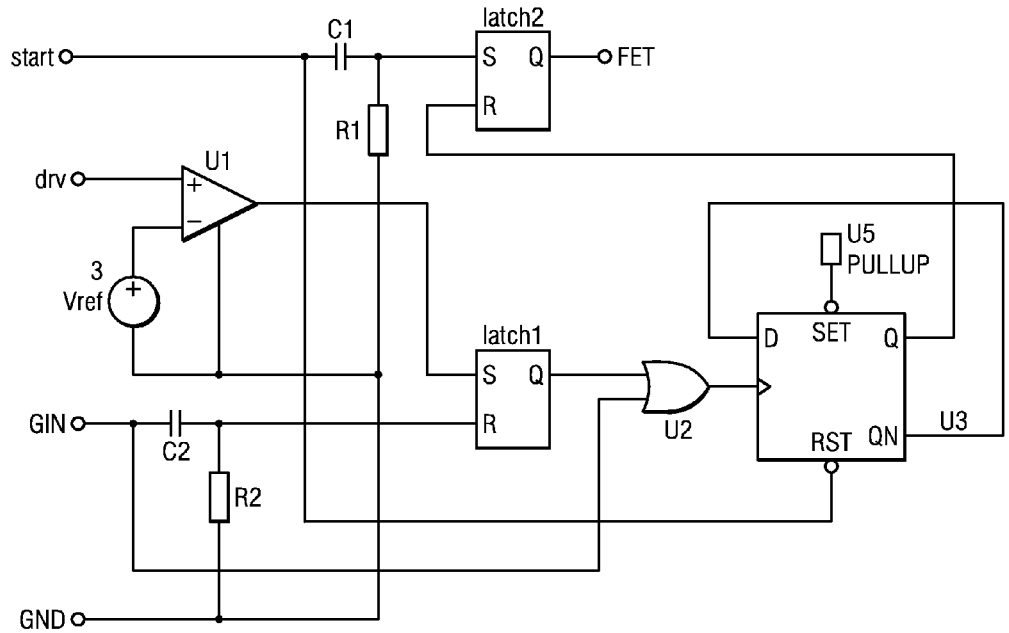

Turning now to FIG. 8, illustrated is a switch detector employable as the switch detector (designated "switch_detector") of FIG. 6. In the illustrated embodiment, the switch detector detects whether a switch coupled to a drive signal such as the drive voltage drv is, for instance, a MOSFET or a bipolar transistor. When the start signal "start" goes high, which is coupled to a "set" input terminal of latch 2 through the high-pass network formed with a capacitor C1 and a resistor R1, the output Q of latch 2 is set high to initially signal operation in a MOSFET mode (a first mode of operation). The logic indicated in FIG. 8 is operative so that for each pulse, as determined by a pulse-width modulated signal Gin (also referred to as "GIN"), the output Q of latch 2 can be reset low to indicate a bipolar transistor (for a bipolar mode or second mode of operation) if the drive voltage drv of the driver becomes less than a threshold level (e.g., three volts), when the pulse-width modulated signal GIN is high.

Inversely, the output Q of latch 2 is left or can be set high to indicate a MOSFET if the drive voltage drv of the driver becomes greater than the threshold level when the pulse-width modulated signal GIN is high. Timing for these operations is controlled by a comparator U1 with 3-volt reference Vref coupled to its inverting input. The output of the comparator U1 is coupled to the "set" input of latch 1, the output of which is coupled to an OR gate U2 to signal when the drive voltage drv is greater than three volts. The output of the OR gate U2 is coupled to a D flip-flop U5. The output of the D flip-flop U5 is coupled to the "reset" input of latch 2. Further timing for these operations is controlled by the pulse-width modulated signal GIN that is coupled through the high-pass network formed with the capacitor C2 and the resistor R2, the output of which is coupled to the "reset" input of latch 1. The pulse-width modulated signal GIN is also coupled to the reset input of the D flip-flop U5.

Figure 9:
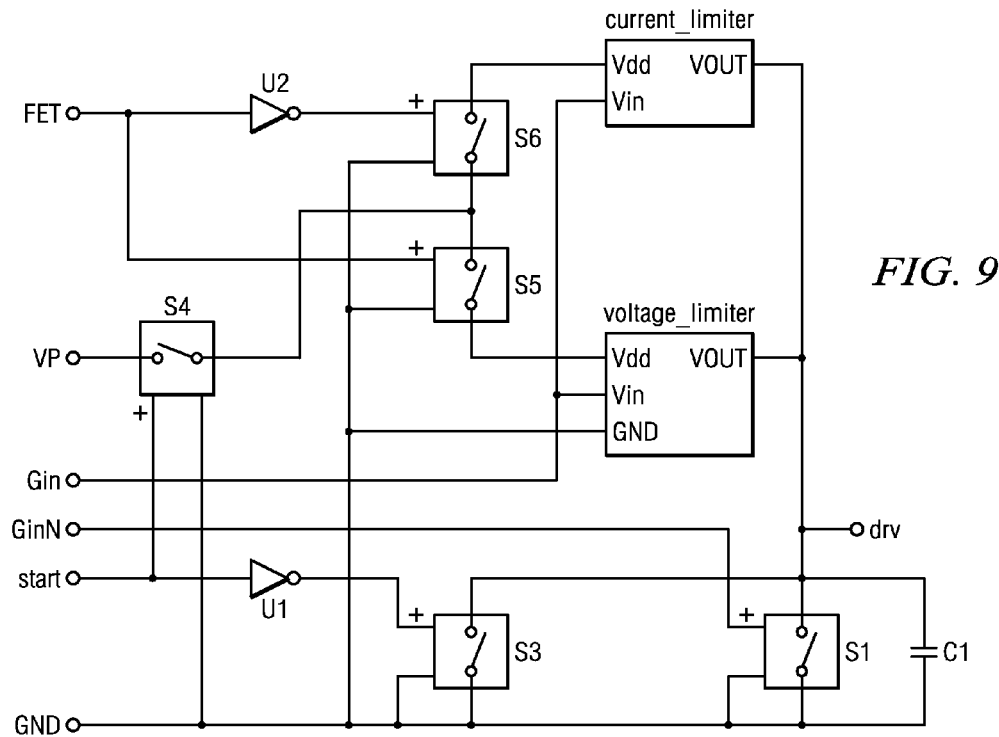

Turning now to FIG. 9, illustrated is a driver employable as the driver (designated "driver") of FIG. 6. The driver produces a series of pulses for the drive signal such as the drive voltage drv to control a switch. The switch detect signal FET indicates whether the switch is a MOSFET (for a first mode of operation) or a bipolar transistor (for a second mode of operation). If the switch detect signal FET is high, the switch has been detected as a MOSFET; otherwise, the switch has been detected as a bipolar transistor. The pulse-width modulated signal Gin is the signal that determines when the drive voltage drv is high or low. When the pulse-width modulated signal Gin is high, the drive voltage drv is high, and vice versa. The complement pulse-width modulated signal GinN is the complement of the pulse-width modulated signal Gin. The start signal "start" is a signal that is set high when the controller is in an active mode. The signal GND represents local circuit ground.

In operation, when the switch detect signal FET is high, a switch S6 is off and a switch S5 is on. An inverter U2 provides signal inversion to control the switches S5, S6. Accordingly, a current limiter "current_limiter" or the voltage limiter "voltage_limiter" is selected by the switch detect signal FET to control a characteristic of the drive voltage drv. When the controller initiates operation at startup, the switch detect signal FET is set high, thereby representing the first mode of operation (i.e., the driven switch is assumed to be a MOSFET). A switch S4 is switched on when the start signal "start" is high to enable operation of the driver. The switch S4 is configured to connect or disconnect the bias voltage VP from the current limiter current_limiter or the voltage limiter voltage_limiter. A switch S3 is to ensure the drive voltage drv is low when the start signal "start" is low, and a switch S1 pulls the drive voltage drv low when the complement pulse-width modulated signal GinN is high. Thus, the driver produces the drive voltage drv for the switch based on the pulse-width modulated signal Gin.

Figure 10:
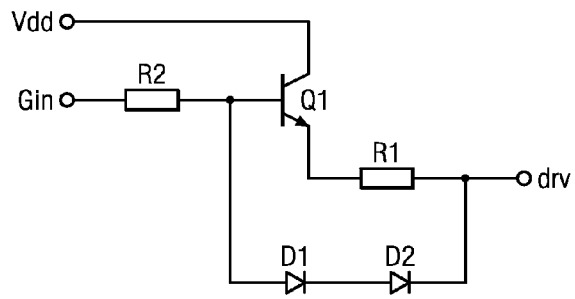

Turning now to FIG. 10, illustrated is a schematic drawing of the current limiter "current_limiter" illustrated in FIG. 9 that limits a current of the drive voltage drv when a bipolar transistor has been detected by the controller (during the second mode of operation), as indicated by the switch detect signal FET set low. The pulse-width modulated signal Gin is coupled through a resistor R2 to the base of a bipolar transistor Q1. The signal Vdd is coupled to the bias voltage VP by switches S4, S6 when the switch detect signal FET is set low, as indicated in FIG. 9. An output of the current limiter is the drive voltage drv. The bipolar transistor Q1 is an active device to limit a current produced at the output of the current limiter. A pair of diodes D1, D2 limit a base voltage of the bipolar transistor Q1 with respect to the drive voltage drv to about one diode drop (i.e., to about 0.7 volts). Accordingly, a constant voltage is produced across a resistor R1 when the pulse-width modulated signal Gin is high, thereby limiting a current that can flow from the output of the current limiter. Thus, the current limiter is configured to limit a current for the control terminal of the switch (via the drive voltage drv) to a current limit when the controller operates in the second mode of operation.

Figure 11:
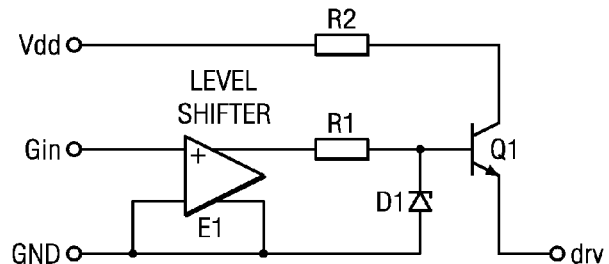

Turning now to FIG. 11, illustrated is a schematic drawing of the voltage limiter "voltage_limiter" illustrated in FIG. 9 that limits a voltage of the drive voltage drv when a MOSFET has been detected by the controller (during the first mode of operation), as indicated by the switch detect signal FET set high. As described previously with reference to FIG. 10, an input to the voltage limiter is the pulse-width modulated signal Gin and an output signal is the drive voltage drv. The signal Vdd is coupled to the bias voltage VP by switches S4, S5 when the switch detect signal FET is set high, as indicated in FIG. 9. The level shifter E1 shifts the voltage level of the pulse-width modulated signal Gin, which is about five volts, by a factor of three to produce a 15-volt signal on the left terminal of a resistor R1. The resistor R1 in conjunction with Zener diode D1 (e.g., a 10 volt Zener diode) produces a 10 volt signal at the base of bipolar transistor Q1, the collector of which is coupled through a resistor R2 to the signal Vdd. Accordingly the signal Vdd, which is the same as the drive voltage drv, is clamped at the emitter of bipolar transistor Q1 to about 10 volts minus a diode drop produced between the base and emitter of transistor Q1. Thus, the circuit illustrated in FIG. 11 is operative as a voltage limiter when the switch detect signal FET is set high indicating detection of a MOSFET. Thus, the voltage limiter is configured to limit a voltage for the control terminal of the switch (via the via the drive voltage drv) to a voltage limit when the controller operates in the first mode of operation.

Figure 12:
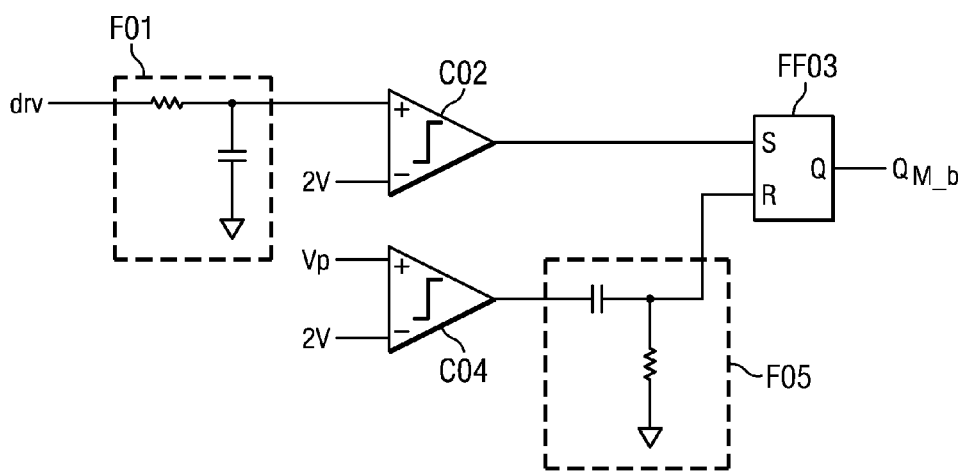

Turning now to FIG. 12, illustrated is another embodiment of a switch detector. While the switch detector of FIG. 12 may be embodied in a controller according to the principles of the present invention, the initial state of a switch detect signal $Q_{M-B}$ is opposite to that of the switch detect signal FET described previously above. In either case, however, the switch detector detects whether a switch coupled to a drive signal such as the drive voltage drv is, for instance, a MOSFET or a bipolar transistor. Upon initial application of bias voltage Vp to the controller, the bias voltage Vp rises, eventually exceeding a threshold voltage of, for instance, two volts. This condition is detected by a comparator C04, which produces an output signal coupled to high pass filter F05. The output of high-pass filter F05 is coupled to the reset input of a flip-flop FF03. The flip-flop FF03 accordingly resets the switch detect signal $Q_{M-B}$ to a low state, indicating that the switch is initially assumed to be a bipolar transistor. The switch detect signal $Q_{M-B}$ remains in a low state until the drive voltage drv, which is connected to low-pass filter F01, exhibits a voltage greater than two volts, which is detected by comparator C02. The low-pass filter F01 is included in the circuit to remove possible extraneous noise from the drive voltage drv. If comparator C02 detects the filtered drive voltage dry greater than two volts, its output goes high, which is coupled to the set input of the flip-flop FF03. In this case, the flip-flop FF03 sets the switch detect signal $Q_{M-B}$ high, indicating the switch is a MOSFET.

Thus, a controller for a switch and a method of operating the same has been introduced herein. In one embodiment, the controller is configured to measure a voltage of a control terminal of the switch and select a first mode of operation (e.g., indicating that the switch is a MOSFET) if the voltage of the control terminal is greater than a threshold voltage, and a second mode of operation (e.g., indicating that the switch is a bipolar transistor) if the voltage of the control terminal is less than the threshold voltage. The controller may include a voltage limiter configured to limit a voltage for the control terminal of the switch to a voltage limit during the first mode of operation. The controller may include a current limiter configured to limit a current for the control terminal of the switch to a current limit during the second mode of operation. An under-voltage lockout level of the controller may be set to a higher level during the first mode of operation than during the second mode of operation. The controller may include a timer configured to produce a pulse-width modulated signal. The controller is configured to control a duty cycle of the switch to regulate an output voltage of a power converter. The controller may initiate operation in the first mode of operation at startup.

Those skilled in the art should understand that the previously described embodiments of a switched-capacitor power converter and related methods of operating the same are submitted for illustrative purposes only. While the principles of the present invention have been described in the environment of a power converter, these principles may also be applied to other systems such as, without limitation, a power amplifier or a motor controller. For a better understanding of power converters, see "Modern DC-to-DC Power Switch-mode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991).

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controller for a switch configured to measure a voltage of a control terminal of said switch and select a first mode of operation if said voltage of said control terminal is greater than a threshold voltage, and a second mode of operation if said voltage of said control terminal is less than said threshold voltage, wherein said first mode of operation signifies that said switch is a field-effect transistor and said second mode of operation signifies that said switch is a bipolar transistor.

2. The controller as recited in claim 1 further comprising a voltage limiter configured to limit a voltage for said control terminal of said switch to a voltage limit during said first mode of operation.

3. The controller as recited in claim 1 further comprising a current limiter configured to limit a current for said control terminal of said switch to a current limit during said second mode of operation.

4. The controller as recited in claim 1 wherein an under-voltage lockout level is configured to be set to a higher level during said first mode of operation than during said second mode of operation.

5. The controller as recited in claim 1 further comprising a timer configured to produce a pulse-width modulated signal.

6. The controller as recited in claim 1 wherein said controller is configured to control a duty cycle of said switch to regulate an output voltage of a power converter.

7. The controller as recited in claim 1 wherein said controller is configured to initiate operation in said first mode of operation at startup.

8. A method, comprising:
measuring a voltage of a control terminal of a switch; and
selecting a first mode of operation if said voltage of said control terminal is greater than a threshold voltage, and a second mode of operation if said voltage of said control terminal is less than said threshold voltage, wherein said first mode of operation signifies that said switch is a field-effect transistor and said second mode of operation signifies that said switch is a bipolar transistor.

9. The method as recited in claim 8 further comprising limiting a voltage for said control terminal of said switch to a voltage limit during said first mode of operation.

10. The method as recited in claim 8 further comprising limiting a current for said control terminal of said switch to a current limit during said second mode of operation.

11. The method as recited in claim 8 further comprising setting an under-voltage lockout level to a higher level during said first mode of operation than during said second mode of operation.

12. The method as recited in claim 8 further comprising producing a pulse-width modulated signal.

13. The method as recited in claim 8 further comprising controlling a duty cycle of said switch to regulate an output voltage of a power converter.

14. The method as recited in claim 8 further comprising initiating operation in said first mode of operation at startup.

15. A power converter, comprising:
a power switch coupled to an input of said power converter;
a transformer interposed between said power switch and an output of said power converter; and
controller for said power switch configured to measure a voltage of a control terminal of said power switch and select a first mode of operation if said voltage of said control terminal is greater than a threshold voltage, and a second mode of operation if said voltage of said control terminal is less than said threshold voltage, wherein said first mode of operation signifies that said power switch is a field-effect transistor and said second mode of operation signifies that said power switch is a bipolar transistor.

16. The power converter as recited in claim 15 wherein said controller comprises a voltage limiter configured to limit a voltage for said control terminal of said switch to a voltage limit during said first mode of operation.

17. The power converter as recited in claim 15 wherein said controller comprises a current limiter configured to limit a current for said control terminal of said switch to a current limit during said second mode of operation.

18. The power converter as recited in claim 15 wherein an under-voltage lockout level is configured to be set to a higher level during said first mode of operation than during said second mode of operation.

19. The power converter as recited in claim 15 wherein said controller comprises a timer configured to produce a pulse-width modulated signal.

20. The power converter as recited in claim 15 wherein said controller is configured to initiate operation in said first mode of operation at startup.

* * * * *